United States Patent Office 2,875,227
Patented Feb. 24, 1959

2,875,227

EPHEDRINE SALTS OF 7-CARBOETHOXY-3-ACETYLTHIOHEPTANOIC ACID

Edward Walton, Scotch Plains, and Arthur F. Wagner, Princeton, N. J., assignors to Merck & Co., Inc., Rahway, N. J., a corporation of New Jersey No Drawing. Application May 11, 1955
Serial No. 507,726

3 Claims. (Cl. 260—455)

This invention relates to the resolution of chemical compounds into optically active forms or (+) and (−) enantiomorphs and particularly with the resolution of a heptanoic acid derivative into (+) and (−) enantiomorphs thereof.

This application is a continuation in part of our copending application Serial No. 445,166, filed July 22, 1954, and now U. S. Patent 2,792,413

α-Lipoic acid or 5-[3-(1,2-dithiacyclopentyl] pentanoic acid is a valuable growth stimulating crystalline substance which was obtained from liver and later reported to have the structural formula

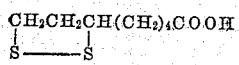

as is disclosed in the J. A. C. S. 74, 3455 (1952). It has been used effectively in treating various diseases of the liver as reported by Dr. F. Rausch in Arzneimittel-Forschung 5, No. 1, pages 32–4 (1955).

α-Lipoic acid has an asymmetric center and accordingly may exist in optically active forms. In this regard, it has been found that (+)-α-lipoic acid is the natural form of this compound and accordingly the preferred form for use where α-lipoic acid activity is indicated. Of the various chemical synthetic methods of preparing α-lipoic acid disclosed in the prior art there is apparently no teaching of a method for the preparation of the (+) and (−) enantiomorphic forms of α-lipoic acid.

It is an object of this invention therefore to provide novel processes of producing (−)-α-lipoic acid and (+)-α-lipoic acid. Another object is to provide novel optically active compounds and processes of preparing the same which are useful in synthesizing the optically active forms of α-lipoic acid. Other objects, and the advantages of the invention will be apparent from the following description of this invention.

It has now been discovered according to the present invention that mixtures of the (+) and (−) enantiomorphs of 7-carboethoxy-3-acetylthioheptanoic acid such as a racemate thereof may be resolved into (+) and (−) optical isomers. As a result of this discovery, (+)-α-lipoic acid and (−)-α-lipoic acid may be conveniently produced according to the processes disclosed in United States patent application Serial No. 445,165, filed July 22, 1954, and now U. S. Patent 2,792,414, by utilizing the (+) and (−) optical forms of 7-carboethoxy-3-acetylthioheptanoic acid in place of the racemate in such processes.

The desired resolution of racemic 7-carboethoxy-3-acetylthioheptanoic acid or other mixtures of the (+) and (−) enantiomorphs thereof is achieved according to the present invention by reacting the mixture with *l*-ephedrine or *d*-ephedrine to produce a mixture of (+)-7-carboethoxy-3-acetylthioheptanoic acid *l*-ephedrine salt and (−)-7-carboethoxy-3-acetylthioheptanoic acid *l*-ephedrine salt or (+)-7-carboethoxy-3-acetylthioheptanoic acid *d*-ephedrine salt and (−)-7-carboethoxy-3-acetylthioheptanoic acid *d*-ephedrine salt; separating said mixture into the individual (+) and (−) ephedrine salts by means of fractional crystallization; and converting said separated ephedrine salts to (+)-7-carboethoxy-3-acetylthioheptanoic acid and (−)-7-carboethoxy-3-acetylthioheptanoic acid.

The mixture of (+)-7-carboethoxy-3-acetylthioheptanoic acid *l*-ephedrine salt and (−)-7-carboethoxy-3-acetylthioheptanoic acid *l*-ephedrine salt is conveniently prepared by intimately contacting 7-carboethoxy-3-acetylthioheptanoic acid and *l*-ephedrine, preferably in equimolar quantities, in a suitable inert liquid reaction medium. Solvents such as lower ethers, dioxane, lower alcohols, benzene and toluene and aqueous mixtures thereof are suitable reaction media for this purpose. The reaction proceeds at room temperature and is quickly completed. The mixture of (+) and (−) *l*-ephedrine salts is conveniently recovered, if desired, from the reaction mixture by conventional methods such as filtration or by evaporation to dryness.

Separation of the (+)-7-carboethoxy-3-acetylthioheptanoic acid *l*-ephedrine salt from the (−)-7-carboethoxy-3-acetylthioheptanoic acid *l*-ephedrine salt by fractional crystallization is conveniently accomplished by intimately contacting said mixture with a suitable solvent or mixture of solvents, but preferably with ethyl ether. Contact between the ether and mixture of (+) and (−) *l*-ephedrine salts may be brought about either by adding said mixture to the ether or by forming the mixture in situ by effecting the reaction of 7-carboethoxy-3-acetylthioheptanoic acid with *l*-ephedrine in the presence of ether. As a result of contacting the mixture of (+) and (−) *l*-ephedrine salts with ether there is obtained at ordinary temperatures, such as room temperature, a precipitate of (−)-7-carboethoxy-3-acetylthioheptanoic acid *l*-ephedrine salt and an ether solution of (+)-7-carboethoxy-3-acetylthioheptanoic acid *l*-ephedrine salt. By filtration or decantation of the ether solution the (−)-7-carboethoxy-3-acetylthioheptanoic acid *l*-ephedrine salt is recovered directly in crystalline form. It may be recrystallized, if desired, from a suitable solvent such as methanol. By evaporating the resulting ether solution to dryness the (+)-7-carboethoxy-3-acetylthioheptanoic acid *l*-ephedrine salt may be recovered in a noncrystalline form.

The mixture of (+)-7-carboethoxy-3-acetylthioheptanoic acid *d*-ephedrine salt and (−)-7-carboethoxy-3-acetylthioheptanoic acid *d*-ephedrine salt is conveniently prepared by intimately contacting 7-carboethoxy-3-acetylthioheptanoic acid and *d*-ephedrine, preferably in equimolar quantities, in a suitable inert liquid reaction medium. Solvents such as lower ethers, dioxane, lower alcohols, benzene and toluene and aqueous mixtures thereof are suitable reaction media for this purpose. The reaction proceeds at room temperature and is quickly completed. On completion of the reaction the (+)-3-acetylthio-7-carboethoxyheptanoic acid *d*-ephedrine salt crystallizes from the solution and can readily be separated by filtration. The salt can be further purified by recrystallizing from a suitable solvent such as methanol-ethyl ether mixtures. This method of separation is preferred because it results in the direct crystallization of the desired product.

The (+) and (−) *l*-ephedrine and *d*-ephedrine salts produced and isolated as described above may be converted to the free acids (−)-7-carboethoxy-3-acetylthioheptanoic acid and (+)-7-carboethoxy-3-acetylthioheptanoic acid by treating the corresponding ephedrine salts with a suitable acid, and preferably a nonoxidizing mineral acid such as sulfuric acid, hydrobromic acid, hydrochloric acid and phosphoric acid. This conversion is conveniently achieved by contacting the ephedrine salt and the acid in a liquid reaction medium, preferably in aqueous or organic solvents such as lower alcohols, benzene, chloroform and mixtures thereof. Although an equivalent amount of acid is sufficient to effect the conversion it is ordinarily desired to employ an excess of acid. Recovery of the desired (+) and (−) isomers from the reaction mixture is conveniently effected by conventional methods such as separating the organic phase when present and evaporating to dryness or by extracting the reaction mixture with a water immiscible solvent and subsequently evaporating the organic extract to dryness. The (−)-7-carboethoxy-3-acetylthioheptanoic acid is thus obtained in pure form whereas to obtain (+)-7-carboethoxy-3-acetylthioheptanoic acid in a purified form it is treated further according to the novel methods described immediately hereinafter.

Purification of (+)-7-carboethoxy-3-acetylthioheptanoic acid may be effected by the discovery that said compound reacts with benzhydrylamine in suitable organic solvents and mixtures thereof, including aqueous mixtures, and preferably isopropyl ether, to form a crystalline benzhydrylamine salt of (+)-7-carboethoxy-3-acetylthioheptanoic acid which separates from the reaction mixture. This salt may be recovered by filtration. By acidifying a solution of said salt employing the acids and conditions previously described above there is produced pure (+)-7-carboethoxy-3-acetylthioheptanoic acid.

The following examples are added to further illustrate the invention but it is to be understood that the invention is not to be limited thereby.

EXAMPLE 1

*(−)-7-carboethoxy-3-acetylthioheptanoic acid and the l-ephedrine salt thereof*

A solution of 5 g. of racemic-7-carboethoxy-3-acetylthioheptanoic acid in 50 ml. of ether was mixed with a solution of 3 g. of *l*-ephedrine in 50 ml. of ether. After the reaction mixture was kept at room temperature for a short time crystalline (−)-7-carboethoxy-3-acetylthioheptanoic acid *l*-ephedrine salt precipitated; M. P. 125–128° C. The product was recrystallized twice from methanol; M. P. 129–131° C.

A 2.25 g. portion of (−)-7-carboethoxy-3-acetylthioheptanoic acid *l*-ephedrine salt was suspended in 50 ml. of water and 40 ml. of ether. The mixture was acidified with dilute hydrochloric acid and the ether layer was separated. The aqueous phase was extracted with a 40 ml. portion of ether. The combined ether layers were dried and concentrated under reduced pressure to yield (−)-7-carboethoxy-3-acetylthioheptanoic acid: $n_D^{25}$ 1.4840; $[\alpha]_D^{23}$ −6.8° (c., 8.5 in methanol).

EXAMPLE 2

*(+)-7-carboethoxy-3-acetylthioheptanoic acid and the y-ephedrine salt thereof*

A solution of 153 g. of racemic-7-carboethoxy-3-acetylthioheptanoic acid in 1500 ml. of ether was treated with a solution of 91.5 g. of *l*-ephedrine in 1500 ml. of ether. The mixture was kept at 5° C. overnight and the precipitated crystalline (−)-7-carboethoxy-3-acetylthioheptanoic acid *l*-ephedrine salt removed; M. P. 123–127° C. (+)-7-carboethoxy-3-acetylthioheptanoic acid *l*-ephedrine salt was treated with 500 ml. of water and acidified with hydrochloric acid. The ether layer was separated and the aqueous layer extracted with another portion of ether. The combined ether extracts were dried and concentrated under reduced pressure to yield 87 g. of (+)-7-carboethoxy-3-acetylthioheptanoic acid.

About 35 g. of the (+)-7-carboethoxy-3-acetylthioheptanoic acid dissolved in 200 ml. of isopropyl ether was treated with a solution of benzhydrylamine (obtained from 32 g. of benzhydrylamine hydrochloride) in 200 ml. of isopropyl ether. A crystalline benzhydrylamine salt of (+)-7-carboethoxy-3-acetylthioheptanoic acid was precipitated. It was recrystallized twice from isopropyl ether to yield pure product, M. P. 92–96° C.; $[\alpha]_D^{25}$ +1.3° (c., 8.06 in methanol).

A 14.0 g. portion of (+)-7-carboethoxy-3-acetylthioheptanoic acid benzhydrylamine salt was dissolved in 100 ml. of chloroform and 100 ml. of water was added. The mixture was acidified with hydrochloric acid and the chloroform layer separated. The chloroform layer was washed with water, dilute hydrochloric acid and twice more with water. The chloroform layer was dried and concentrated under reduced pressure to yield pure (+)-7-carboethoxy-3-acetylthioheptanoic acid; $[\alpha]_D^{23}$ +6.80 (c., 8.65 in methanol).

EXAMPLE 3

*(−)-7-carboethoxy-3-acetylthioheptanoic acid d-ephedrine salt and (−)-7-carboethoxy-3-acetylthioheptanoic acid d-ephedrine salt*

A solution of *d*-ephedrine (from 2.2 g. of *d*-ephedrine hydrochloride) in 10 ml. of ether was added to a solution of 2.8 g. (0.01 mole) of DL-3-acetylthio-7-carboethoxyheptanoic acid in 5 ml. of ether. An additional 15 ml. of ether was added. A precipitate of 2.3 g. of crystalline salt, M. P. 119–126°, was obtained. The (−)-7-carboethoxy-3-acetylthioheptanoic acid *d*-ephedrine salt remained in solution. The crystalline product was recrystallized from methanol-ether (1:2) to yield 1.55 g. (35%) of (+)-3-acetylthio-7-carboethoxyheptanoic acid *d*-ephedrine salt, M. P. 129–131°. *Analysis.*—Calcd. for $C_{22}H_{35}NO_6S$: C, 59.84; H, 7.99; N, 3.17; S, 7.26. Found: C, 59.86; H, 7.63; N, 3.05; S, 7.62.

EXAMPLE 4

*(+)-7-carboethoxy-3-acetylthioheptanoic acid and (−)-7-carboethoxy-3-acetylthioheptanoic acid*

The (+)-7-carboethoxy-3-acetylthioheptanoic acid *d*-ephedrine salt prepared in Example 3 was suspended in 6 ml. of chloroform and 6 ml. of 1.3 N hydrochloric acid was added. The chloroform extract was separated and concentrated at reduced pressure to yield 1.1 g. of oil. A 0.66-g. portion of the oil was dissolved in chloroform and extracted into cold aqueous sodium bicarbonate solution. The bicarbonate extract was acidified with dilute hydrochloric acid and the product was extracted into chloroform. The chloroform solution was washed with water, dried over anhydrous magnesium sulfate and filtered. The filtrate was concentrated at reduced pressure to yield 0.3 g. of (+)-3-acetylthio-7-carboethoxyheptanoic acid, $[\alpha]_D^{25}$ +7.5° (c. 7.5, methanol), $n_D^{25}$ 1.4836. In a similar manner the (−)-7-carboethoxy-3-acetylthioheptanoic acid *d*-ephedrine salt was converted to (−)-7-carboethoxy-3-acetylthioheptanoic acid.

Various changes and modifications of the invention can be made and, to the extent that such variations incorporate the spirit of this invention, they are intended to be included within the scope of the appended claims.

What is claimed is:
1. An ephedrine salt of (+)-7-carboethoxy-3-acetylthioheptanoic acid.
2. (+)-7-carboethoxy-3-acetylthioheptanoic acid *d*-ephedrine salt.
3. (+)-7-carboethoxy-3-acetylthioheptanoic acid *l*-ephedrine salt.

References Cited in the file of this patent

UNITED STATES PATENTS 1,867,274    Manske            July 12, 1932